(12) United States Patent
Mink et al.

(10) Patent No.: US 6,939,059 B1
(45) Date of Patent: Sep. 6, 2005

(54) METHOD AND SYSTEM FOR OPTICAL PACKAGING

(75) Inventors: Jan Mink, Geldrop (NL); Remigius Subertus Maria van Roemburg, Veldhoven (NL); Marcel Franz Christian Schemmann, Maria Hoop (NL)

(73) Assignee: Finisar Corporation, Sunnyvale, CA (US)

( * ) Notice: Subject to any disclaimer, the term of this patent is extended or adjusted under 35 U.S.C. 154(b) by 67 days.

(21) Appl. No.: 10/336,182

(22) Filed: Jan. 3, 2003

(51) Int. Cl.[7] .............................. G02B 6/38; G02B 6/42
(52) U.S. Cl. .......................................... 385/94; 385/73
(58) Field of Search ............................... 385/92–94, 73

(56) References Cited

U.S. PATENT DOCUMENTS

| | | | |
|---|---|---|---|
| 5,485,317 A | * | 1/1996 | Perissinotto et al. ........ 359/712 |
| 5,703,992 A | | 12/1997 | Bergmann |
| 6,367,624 B1 | | 4/2002 | Szczepanski et al. |
| 6,416,238 B1 | * | 7/2002 | Gilliland et al. .............. 385/88 |
| 6,457,876 B1 | | 10/2002 | Sawai |
| 6,621,616 B1 | * | 9/2003 | Bauer et al. ................. 359/273 |

* cited by examiner

Primary Examiner—Akm Enayet Ullah
Assistant Examiner—Jerry T Rahll
(74) Attorney, Agent, or Firm—Workman Nydegger (57) ABSTRACT

Method and system for an optical package are disclosed. In one embodiment of the present invention, an optical package comprises: a lead frame; a substrate mounted inside the lead frame; one or more leads attached to the substrate; an optical device or component such as a LOA chip mounted on top of the substrate; a window cap hermetically sealing the optical device or component; one or more lens attached to either side of the window cap; two fibers attached on either side of the window cap; two holes or vias that may serve as inputs into the window cap or outputs from the window cap; an electrical out extending from the window cap; and an electrically isolated enclosure enveloping all contents inside the lead frame.

21 Claims, 13 Drawing Sheets

METHOD AND SYSTEM FOR OPTICAL PACKAGING

BACKGROUND INFORMATION

1. Field of Invention

The present invention relates to the field of optics, and particularly to optical packaging.

2. Description of Related Art

Fiber optic networks are becoming increasingly popular for data transmission due to high speed and high data capacity. An important aspect of a fiber communication system is optical packaging of devices or components for an optical network.

Figure 1:
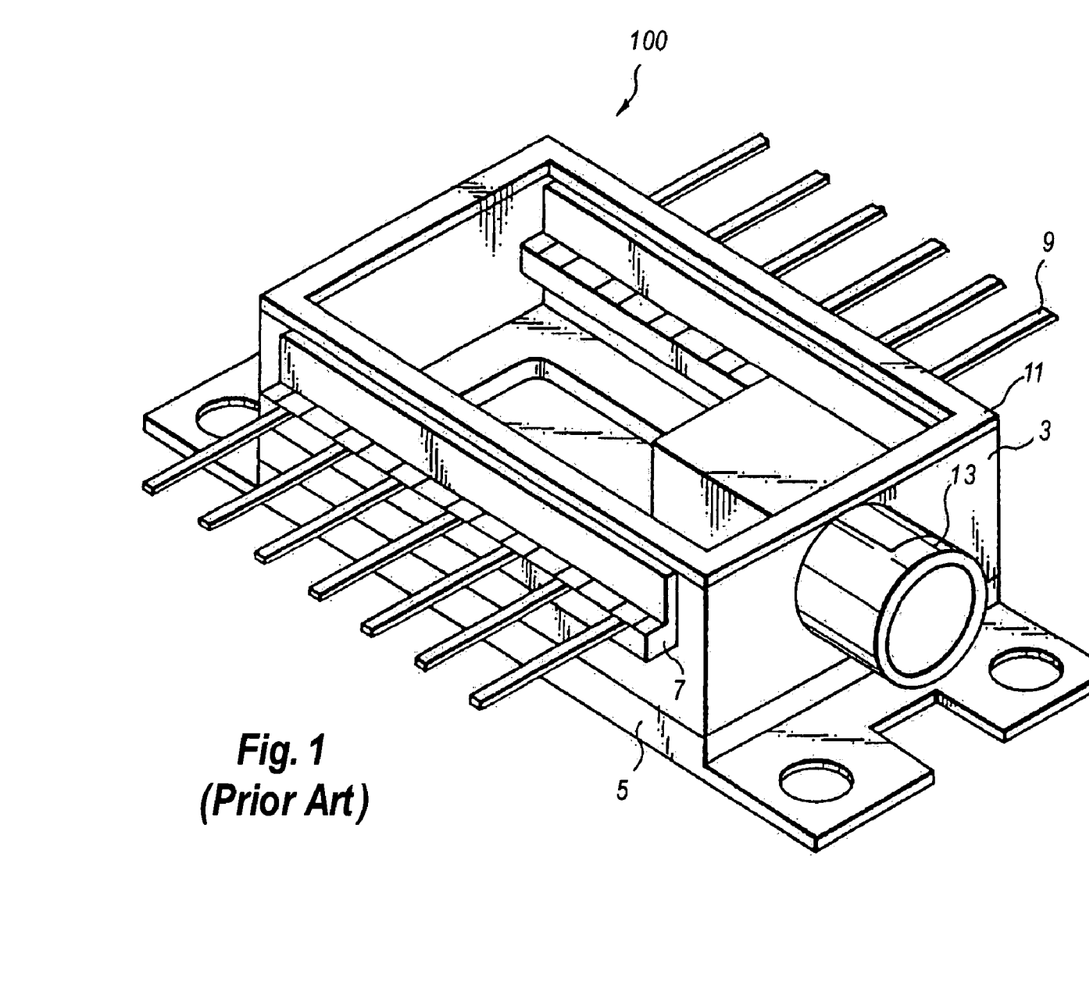
FIG. 1 is a diagram illustrating a prior art optical module package comprising a frame, ceramic terminals, leads, a seal ring, and a window frame.

Conventionally, such devices or components are packaged in optical module packages such as shown in FIG. 1.

FIG. 1 illustrates an optical package 100 comprising: a frame 3, a heat spreader 5, ceramic terminals 7, leads 9, a seal ring 11, and a window frame 13.

Furthermore, heat spreader 5 is attached through silver-brazing to the bottom of frame 3; ceramic terminals 7 and leads 9 are attached through silver-brazing to the side walls of frame 3; seal ring 11 is attached through silver-brazing to the top of frame 3; and window frame 13 is attached to the front end of frame 3.

After a device or component (not shown) is mounted in the inner portion of optical module package 100, a cover (not shown) is seam-welded on seal ring 11 attached to the top of frame 3, thereby assembling an optical module.

Traditional optical module packages such as shown in FIG. 1 adequately package devices or components for an optical network, however, such designs for optical packaging are generally rigid and require that the device be hermetically sealed in a late stage of production, thereby preventing the use of glue or plastic. Moreover, much caution is necessary for bonding during mounting stages.

Accordingly, there is a need for a more flexible optical module package design that allows the hermetical sealing stage to occur ealier.

SUMMARY OF THE INVENTION

The present invention provides a method and system for an optical module package. Moreover, the optical module package may be used to package optical devices or components such as a linear optical amplifier (LOA) chip.

A first optical module package in accordance to one embodiment of the present invention comprises: a lead frame; an electrically isolated substrate; one or more leads attached to both the lead frame and the substrate; one or more support elements attached to the substrate; an optical device or component such as a linear optical amplifier chip mounted on top of the substrate; optionally one or more Peltier elements are attached to the bottom of the substrate for cooling purposes; a window cap that hermetically seals the mounted optical device or component; one or more lens attached to a first side of the window cap; one or more lens attached to a second side of the window cap; a first fiber attached to the one or more lens attached to the first side of the window cap; a second fiber attached to the one or more lens attached to the second side of the window cap; two holes or vias that may serve as inputs into the window cap or outputs from the window cap; an electrical out extending from the window cap; and an electrically isolated enclosure covering the entire substrate.

The method and system of the present invention provides an optical module package that incorporates proven integrated circuit technology such as an electronically isolated substrate and a lead frame. Furthermore, because the optical device or component is hermetically sealed in a relatively early stage, the present invention allows the use of proven compact disk technology such as glues processes. The use of proven technology and relatively inexpensive material such as plastic result in a cost-effective optical package.

BRIEF DESCRIPTION OF THE DRAWINGS

The accompanying drawings that are incorporated in and form a part of this specification illustrate embodiments of the invention and together with the description, serve to explain the principles of the invention.

DETAILED DESCRIPTION

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 2:
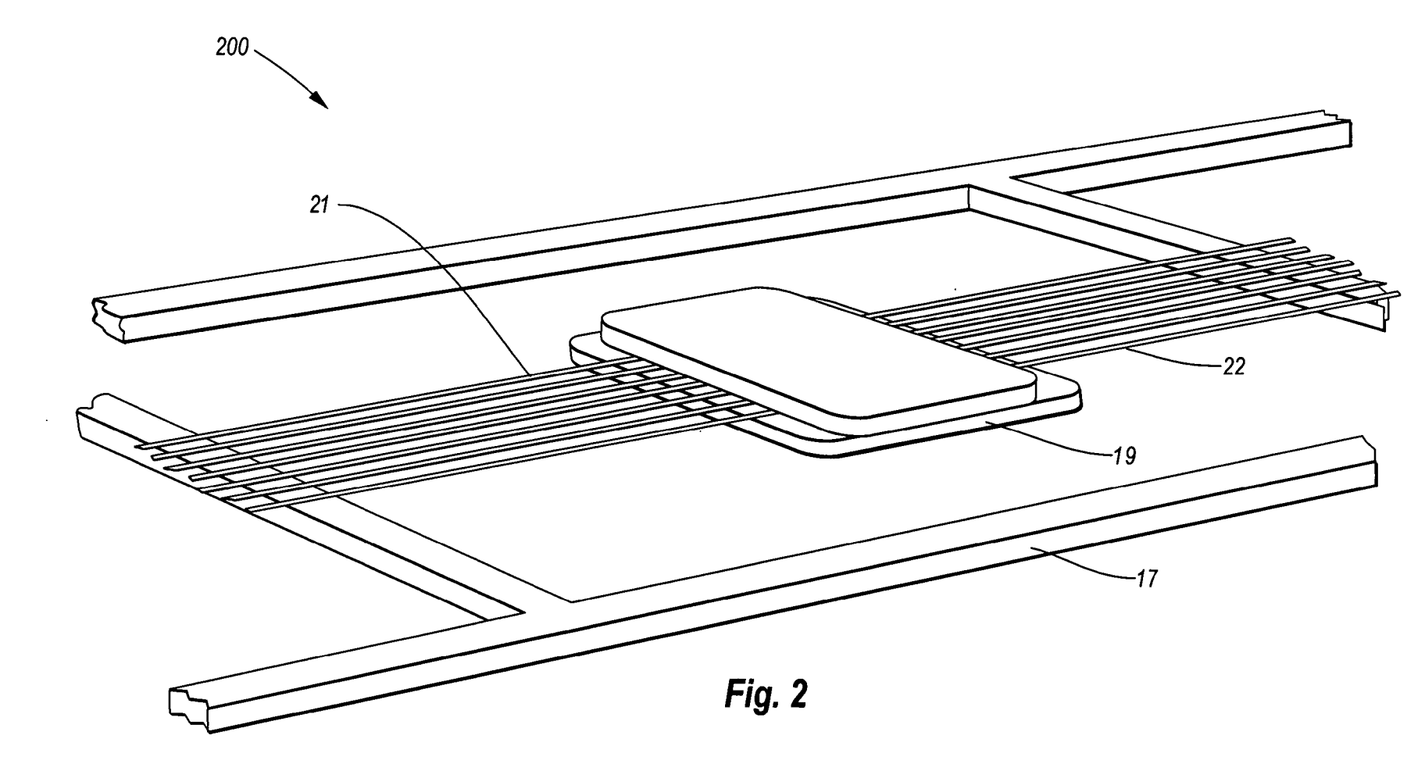
FIG. 2 is a diagram illustrating a lead frame, an electrically isolated substrate, and leads for an optical package in accordance to one embodiment of the present invention.

FIG. 2 illustrates a diagram 200 for an optical package in accordance to one embodiment of the present invention. Block diagram 200 comprises: a lead frame denoted 17; a substrate denoted 19 composed of electrically isolated material such as ceramic; a first plurality of leads denoted 21; and a second plurality of leads denoted 22.

As shown in FIG. 2, single-layer substrate 19 is attached to lead frame 17. Moreover, a first side of substrate 19 is attached to a first plurality of leads 21, and a second side of substrate 19 is attached to a second plurality of leads 22. The first plurality of leads are attached on a second end to a first side of lead frame 17, and the second plurality of leads are attached on a second end to a second side of lead frame 17.

Figure 3:
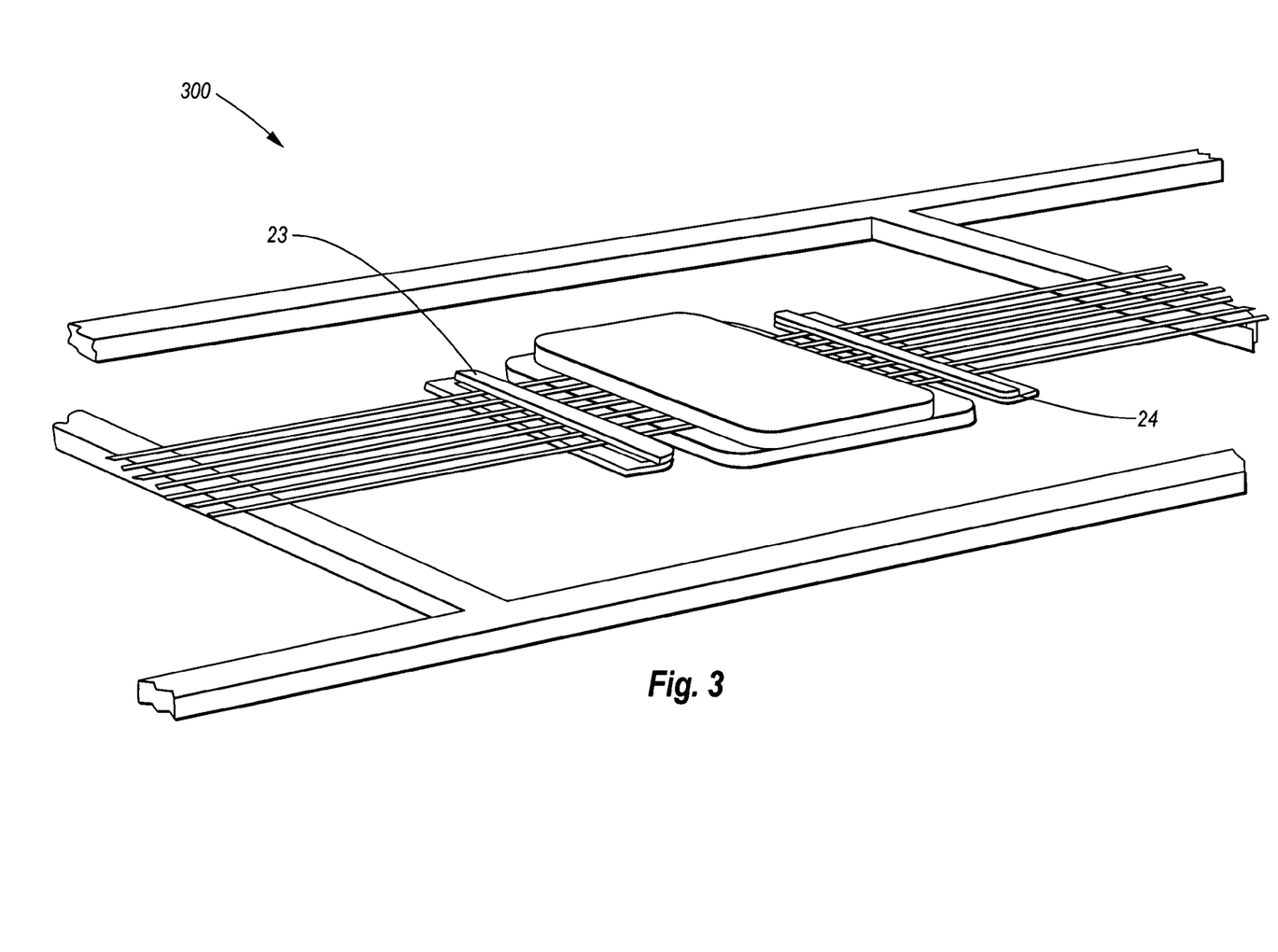
FIG. 3 is a diagram illustrating the components shown in FIG. 2 in combination with supportive interconnections.

Referring now to FIG. 3 in light of FIG. 2. FIG. 3 is a diagram denoted 300 comprising the components shown in FIG. 2 in combination with a first plurality of support elements denoted 23 and a second plurality of support elements denoted 24.

As shown in FIG. 3, the first plurality of support elements are attached to first plurality of leads 21, and the second plurality of support elements are attached to second plurality of leads 22.

Figure 4:
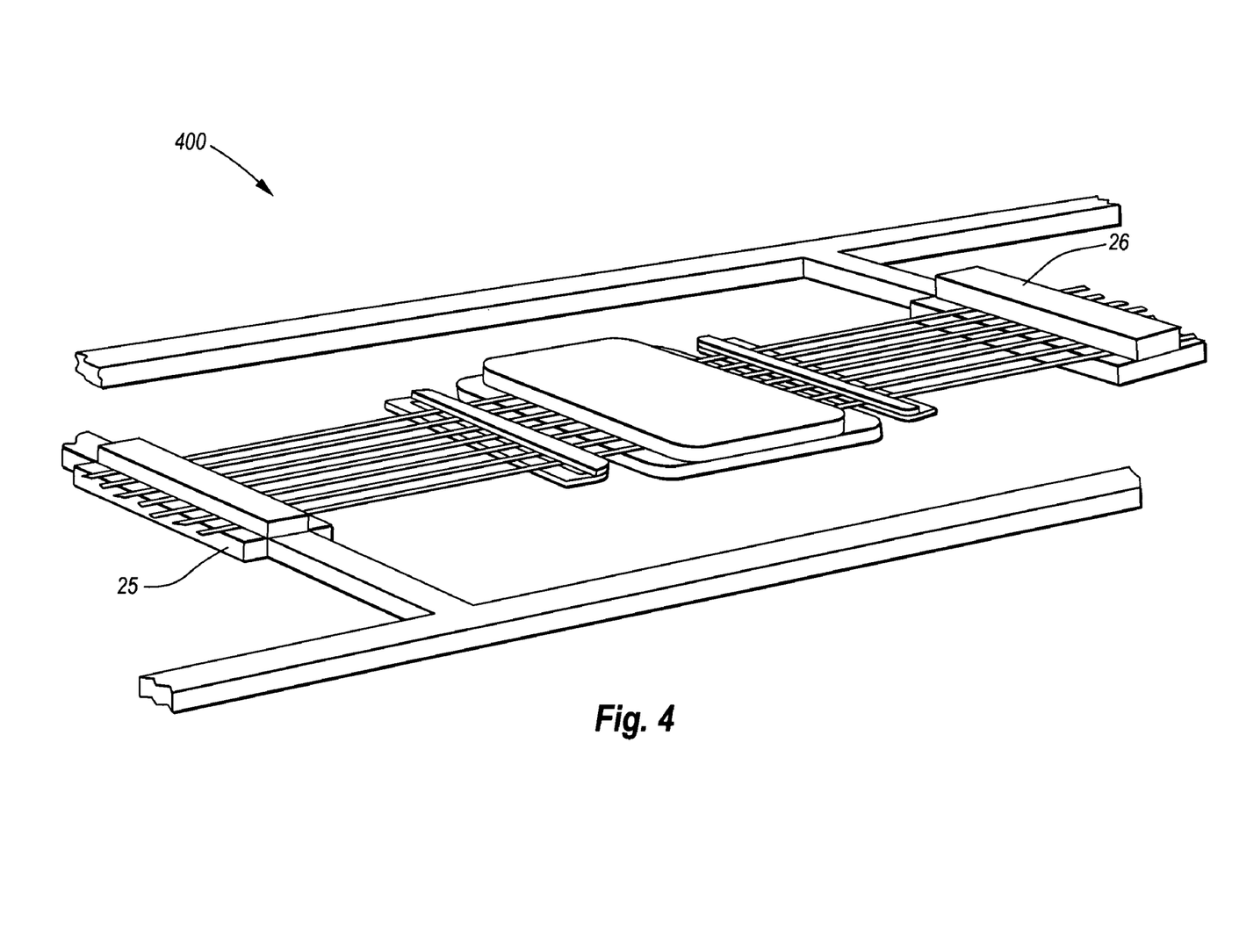
FIG. 4 is a diagram illustrating the components shown in FIG. 3 in combination with isolation elements for split testing.

Referring now to FIG. 4 in light of FIG. 3. FIG. 4 is a diagram denoted 400 comprising the components shown in FIG. 3 in combination with two isolation elements denoted 25 and 26 respectively.

As shown in FIG. 4, a first isolation element 25 comprising electrically isolated material such as ceramic is attached to a first side of lead frame 17, and a second isolation element 26 comprising electrically isolated material such as ceramic is attached to a second side of lead frame 17.

Furthermore, in an environment where a plurality of lead frames such as lead frame 17 are manufactured consecutively in a strip, the isolation elements separate each lead frame from the next in order to allow split testing of each lead frame.

Figure 5:
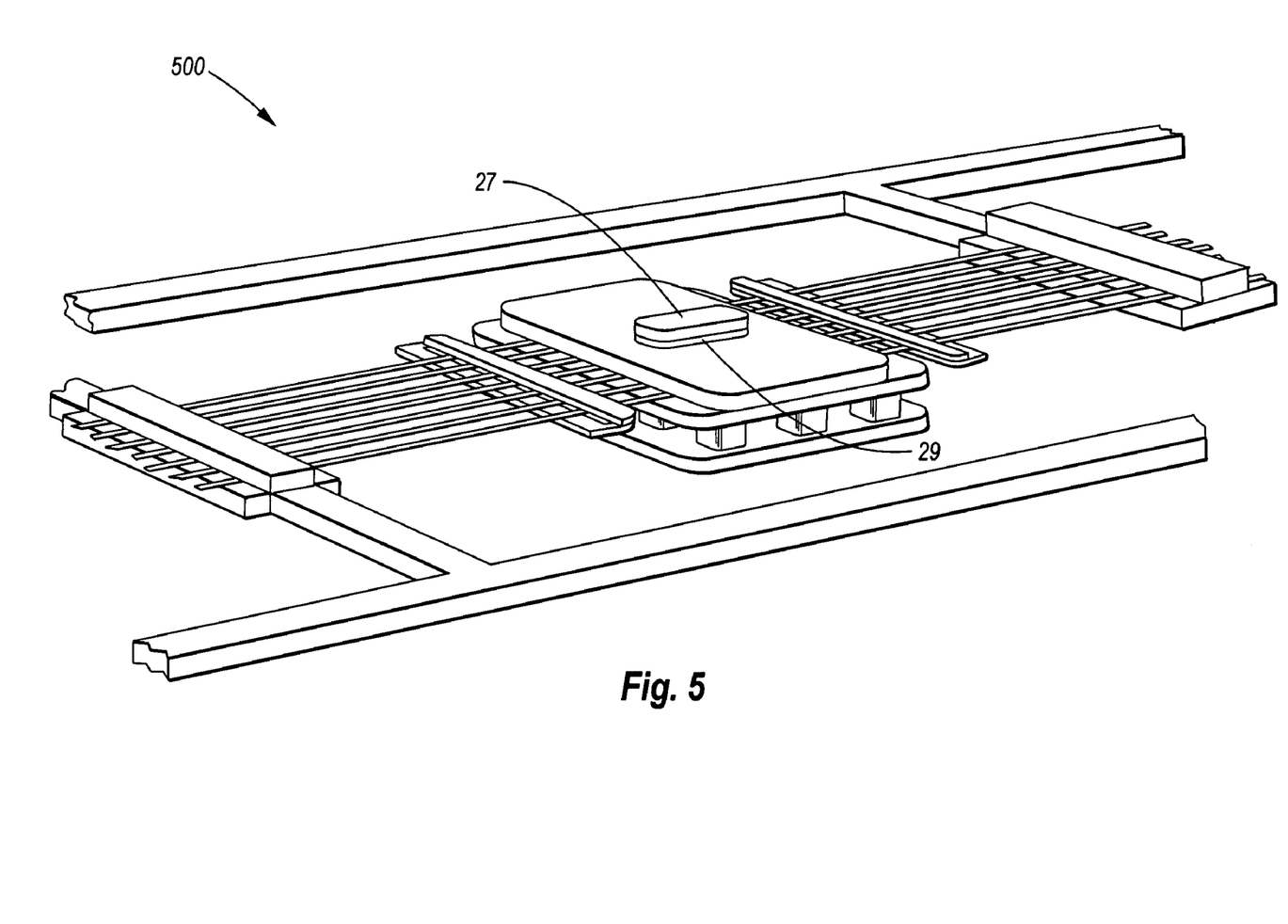
FIG. 5 is a diagram illustrating a sub-mount and a linear optical amplifier (LOA) chip mounted on the substrate shown in FIG. 4.

Referring now to FIG. 5 in light of FIG. 4. FIG. 5 is a diagram denoted 500 comprising the components shown in FIG. 4 in combination with a linear optical amplifier (LOA) chip denoted 27 and a sub-mount denoted 29 mounted on substrate 19. Moreover, sub-mount 29 is composed of a thermally conductive material such as aluminum nitrite or silicon carbite with an expansion coefficient matching that of indium phosphide.

As shown in FIG. 5, sub-mount 29 is mounted on top of substrate 19. Further, linear optical amplifier (LOA) chip 27 is mounted on top of sub-mount 29.

Figure 6:
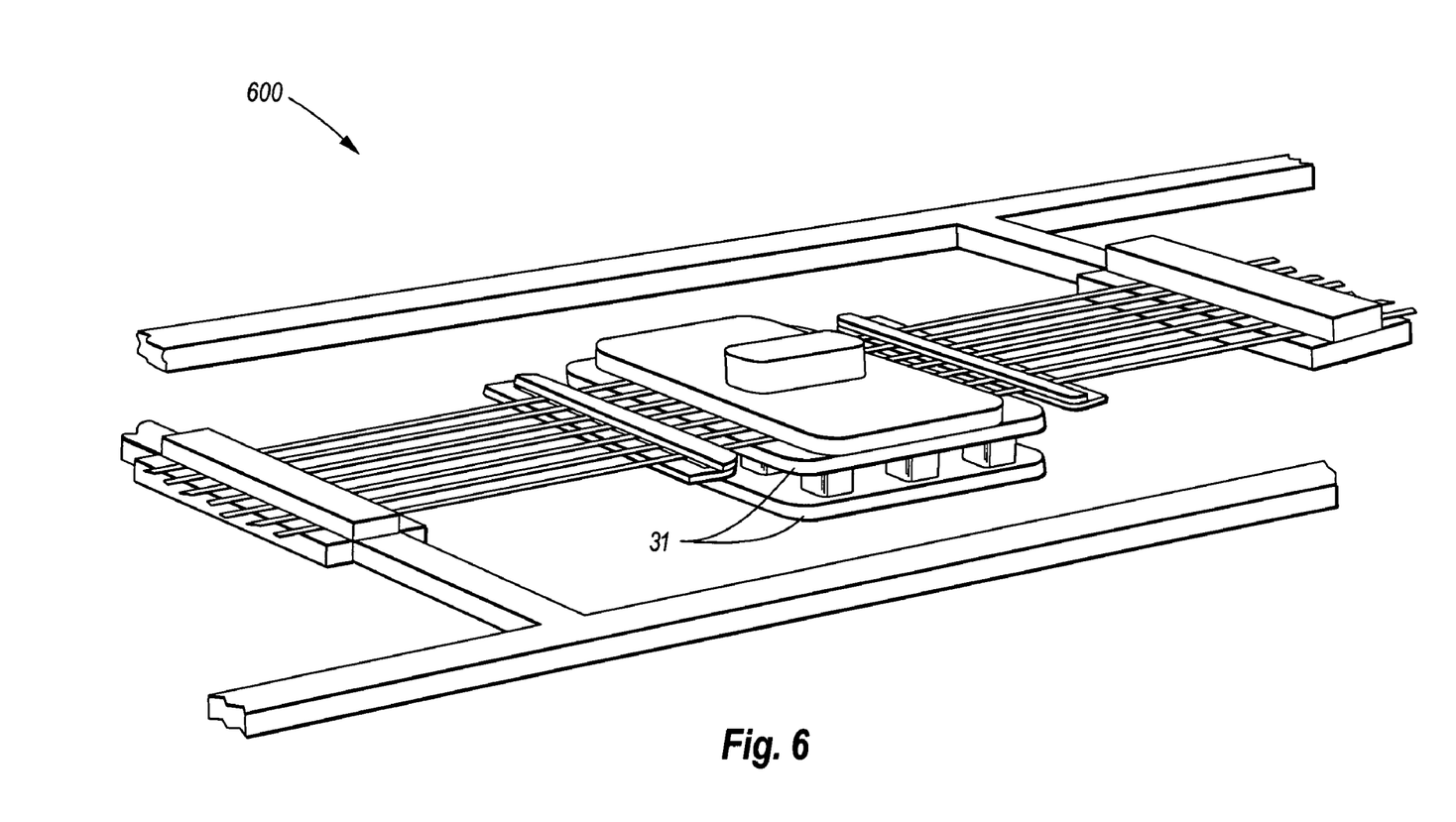
FIG. 6 is a diagram illustrating a Peltier element situated under the substrate shown in FIG. 5.

Referring now to FIG. 6 in light of FIG. 5. FIG. 6 is a diagram denoted 600 comprising the components shown in FIG. 5 in combination with a Peltier element denoted 31.

As shown in FIG. 6, the Peltier element is attached to the bottom of substrate 19. A Peltier element is an electronic package comprising a hot side and a cold side. By energizing a Peltier element, the package transfers heat from the cold side to the hot side. Thus, the Peltier element shown in FIG. 6 serves as a cooling unit.

Figure 7:
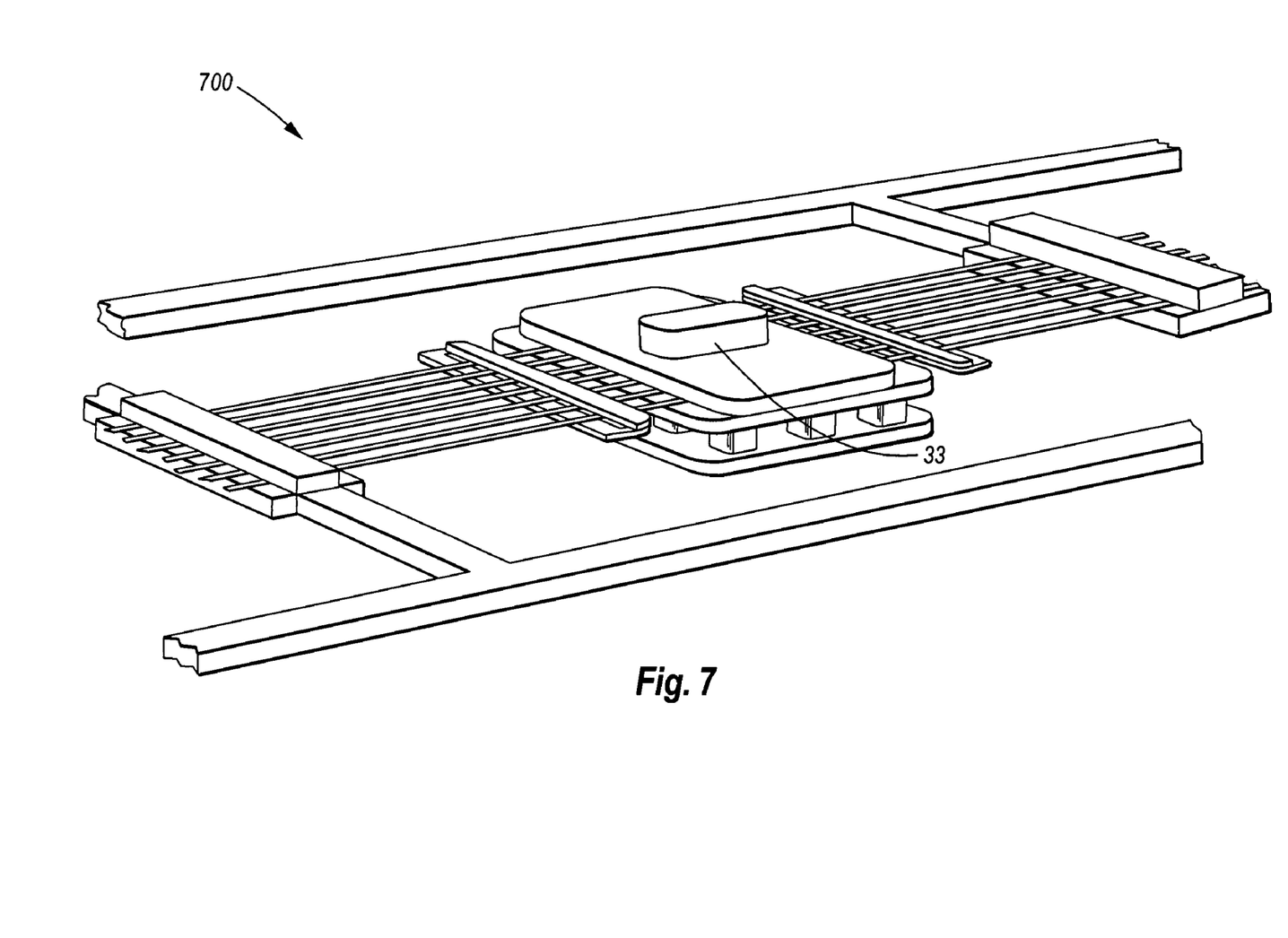
FIG. 7 is a diagram illustrating a window cap hermetically sealing the sub-mount and the LOA chip shown in FIG. 6.

Referring now to FIG. 7 in light of FIG. 6. FIG. 7 is a diagram denoted 700 comprising the components shown in FIG. 6 in combination with a window cap denoted 33.

As shown in FIG. 7, window cap 33 hermetically seals LOA chip 27 and sub-mount 29. Furthermore, because the hermetical sealing effectively guarantees an isolated environment for chip 27, proven processes that utilize glue may be safely applied to construct the remainder of the optical package.

Figure 8:
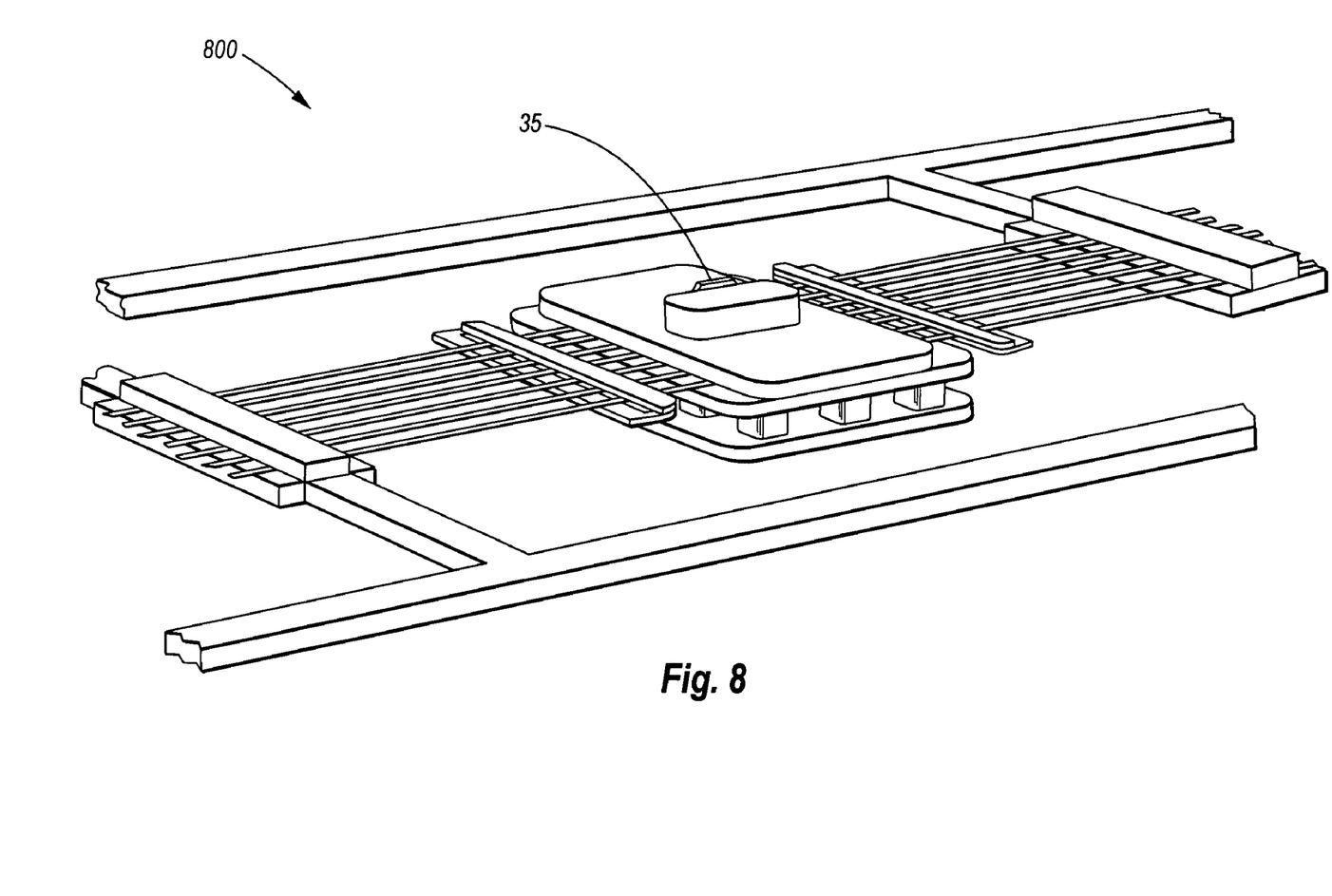
FIG. 8 is a diagram illustrating a first lens attached to a first side the window cap shown in FIG. 7.

Referring now to FIG. 8 in light of FIG. 7. FIG. 8 is a diagram denoted 800 comprising the components shown in FIG. 7 in combination with a first lens denoted 35. Lens 35 maybe an input or output lens as designated.

As shown in FIG. 8, lens 35 is situated on top of substrate 19 and attached to a first side of window cap 33.

Figure 9:
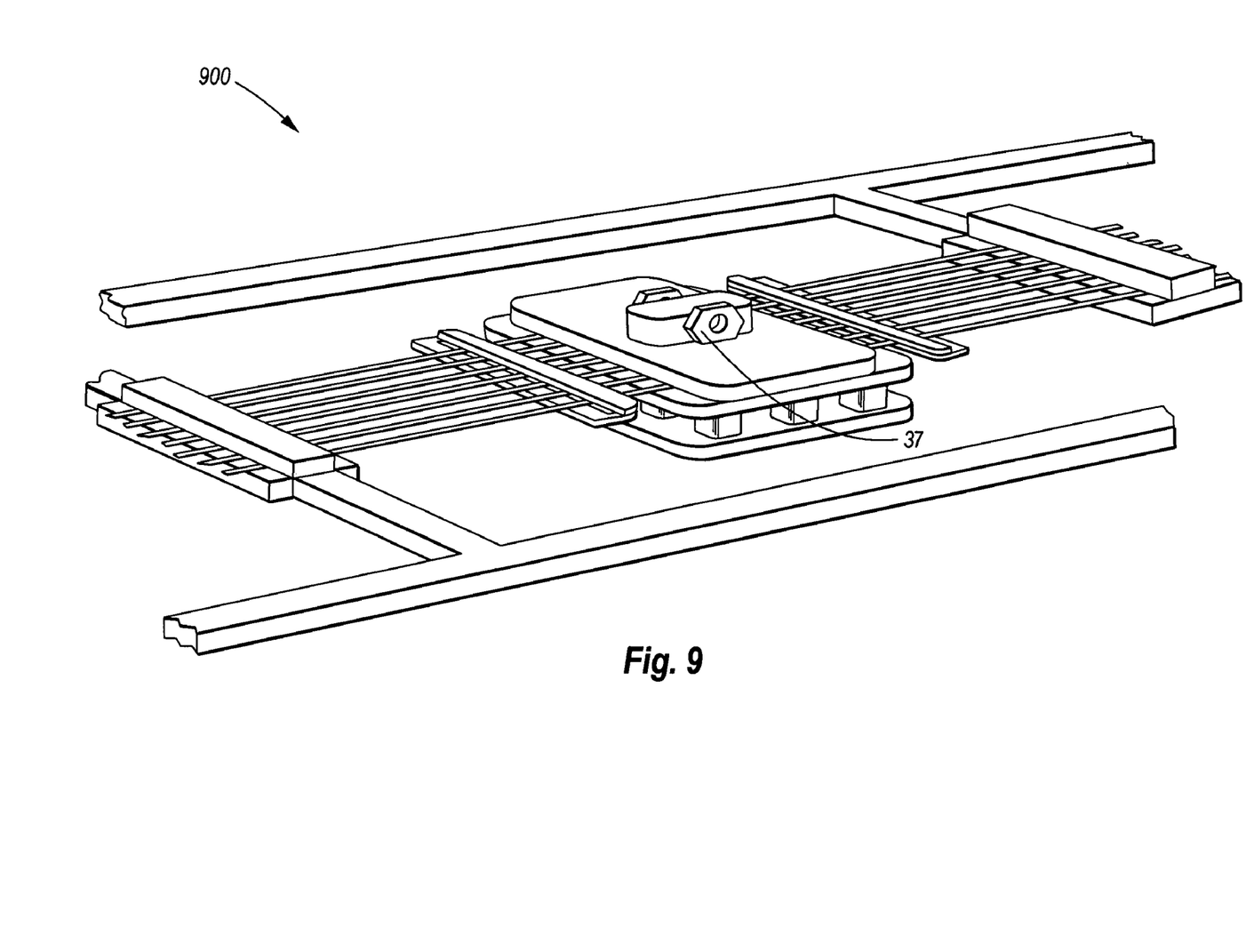
FIG. 9 is a diagram illustrating a second lens attached to a second side of the window cap shown in FIG. 7.

Referring now to FIG. 9 in light of FIG. 8. FIG. 9 is a diagram denoted 900 comprising the components shown in FIG. 8 in combination with a second lens denoted 37. Lens 37 maybe an input or output lens as designated.

As shown in FIG. 9, lens 37 is situated on top of substrate 19 and attached to a second side of window cap 33.

Figure 10:
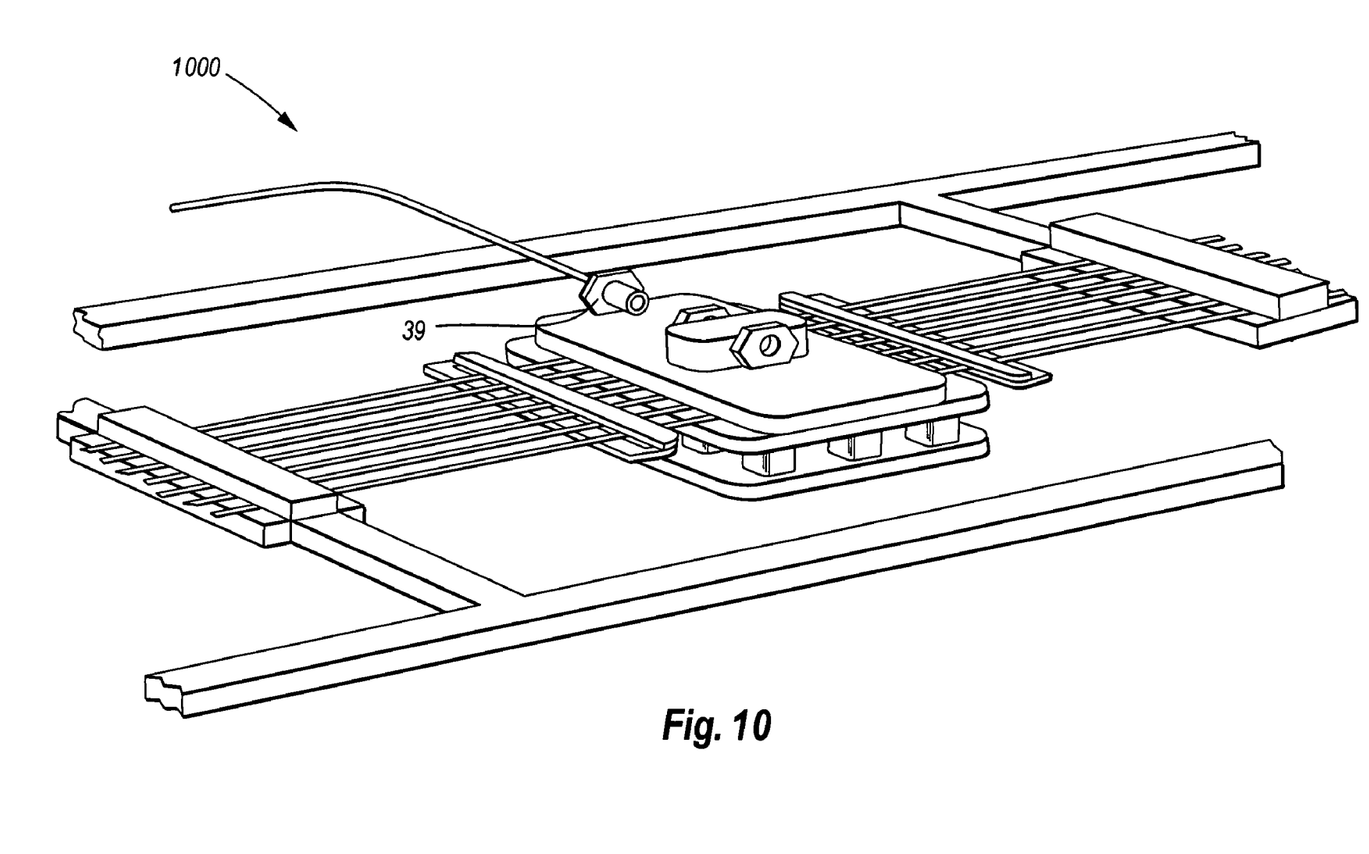
FIG. 10 is a diagram illustrating a first fiber attached to the top of the electrically isolated substrate and lined up to the first lens shown in FIG. 8.

Referring now to FIG. 10 in light of FIG. 9. FIG. 10 is a diagram denoted 1000 comprising the components shown in FIG. 9 in combination with a first fiber denoted 39.

As shown in FIG. 10, fiber 39 is attached on top of substrate 19 and directly lined up to lens 35.

Figure 11:
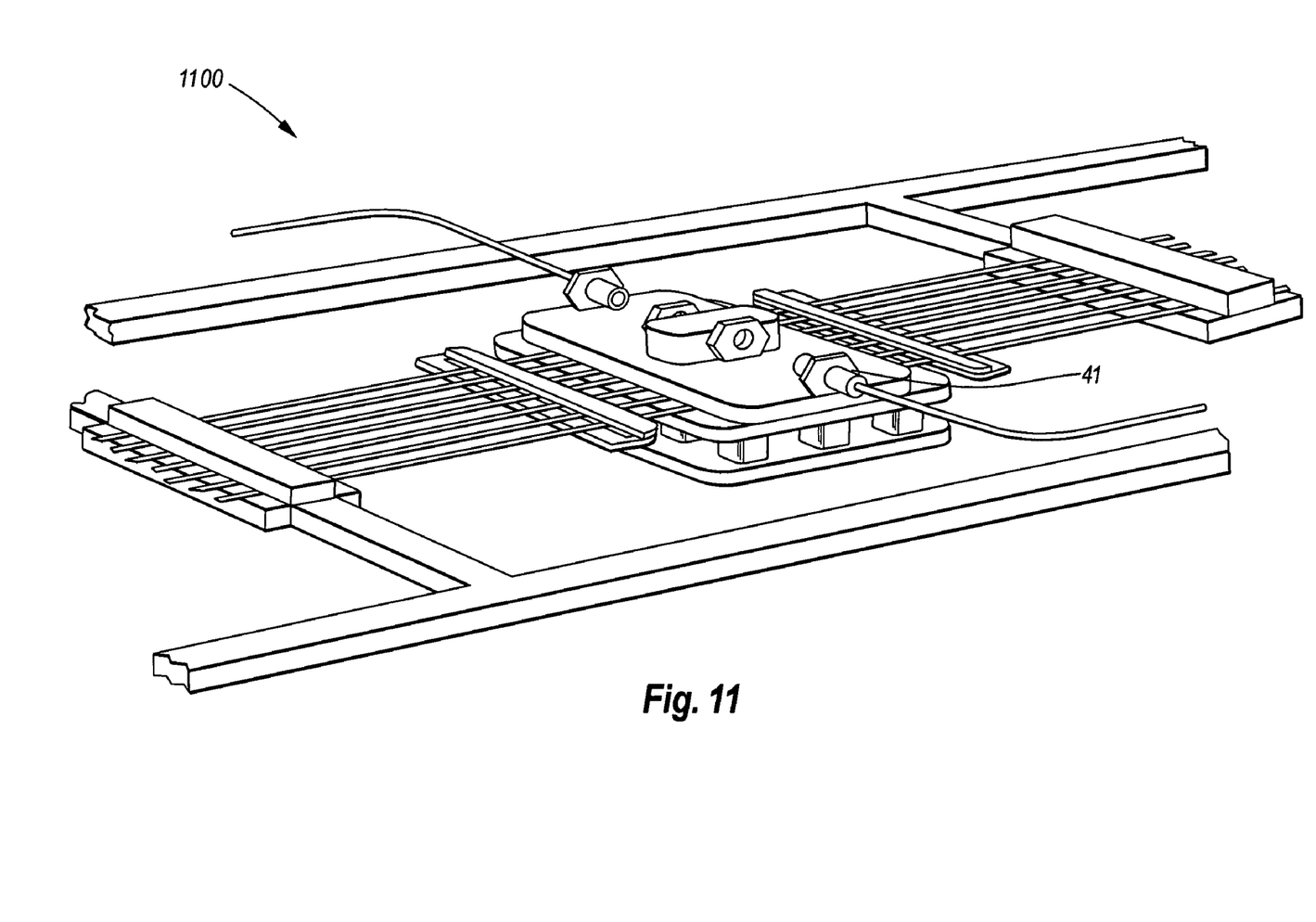
FIG. 11 is a diagram illustrating a second fiber attached to the to top the electrically isolated substrate and lined up to the second lens in FIG. 9.

Referring now to FIG. 11 in light of FIG. 10. FIG. 11 is a diagram denoted 1100 comprising the components shown in FIG. 10 in combination with a second fiber denoted 41.

As shown in FIG. 1, input fiber 41 is attached to the top of substrate 19 and directly lined up to lens 37.

Figure 12:
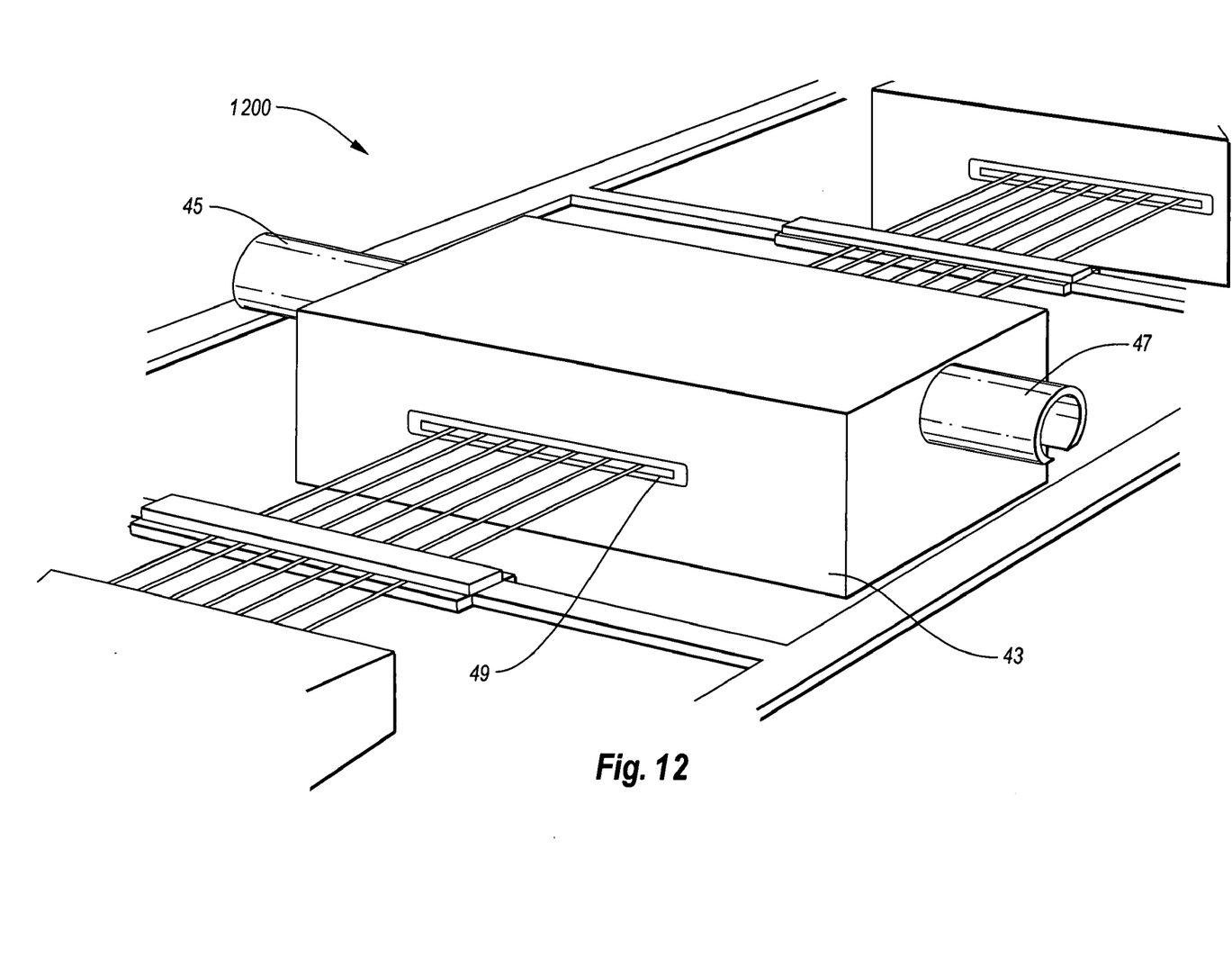
FIG. 12 is a diagram illustrating an electrically isolated enclosure housing the entire contents of the lead frame shown in FIG. 11.

Referring now to FIG. 12 in light of FIG. 11. FIG. 12 is a diagram denoted 1200 comprising the components shown in FIG. 11 in combination with an electrically isolated enclosure denoted 43.

As shown in FIG. 12, an electrically isolated enclosure 43 such as a ceramic enclosure encloses all components in the lead frame shown in FIG. 11, and further comprises: a first end face 45 from which fiber 39 extends; a second end face 47 from which fiber 41 extends; a first ceramic terminal 49 from which a first plurality of leads 21 extends; and a second ceramic terminal (not shown) from which a second plurality of leads 22 extends.

Figure 13:
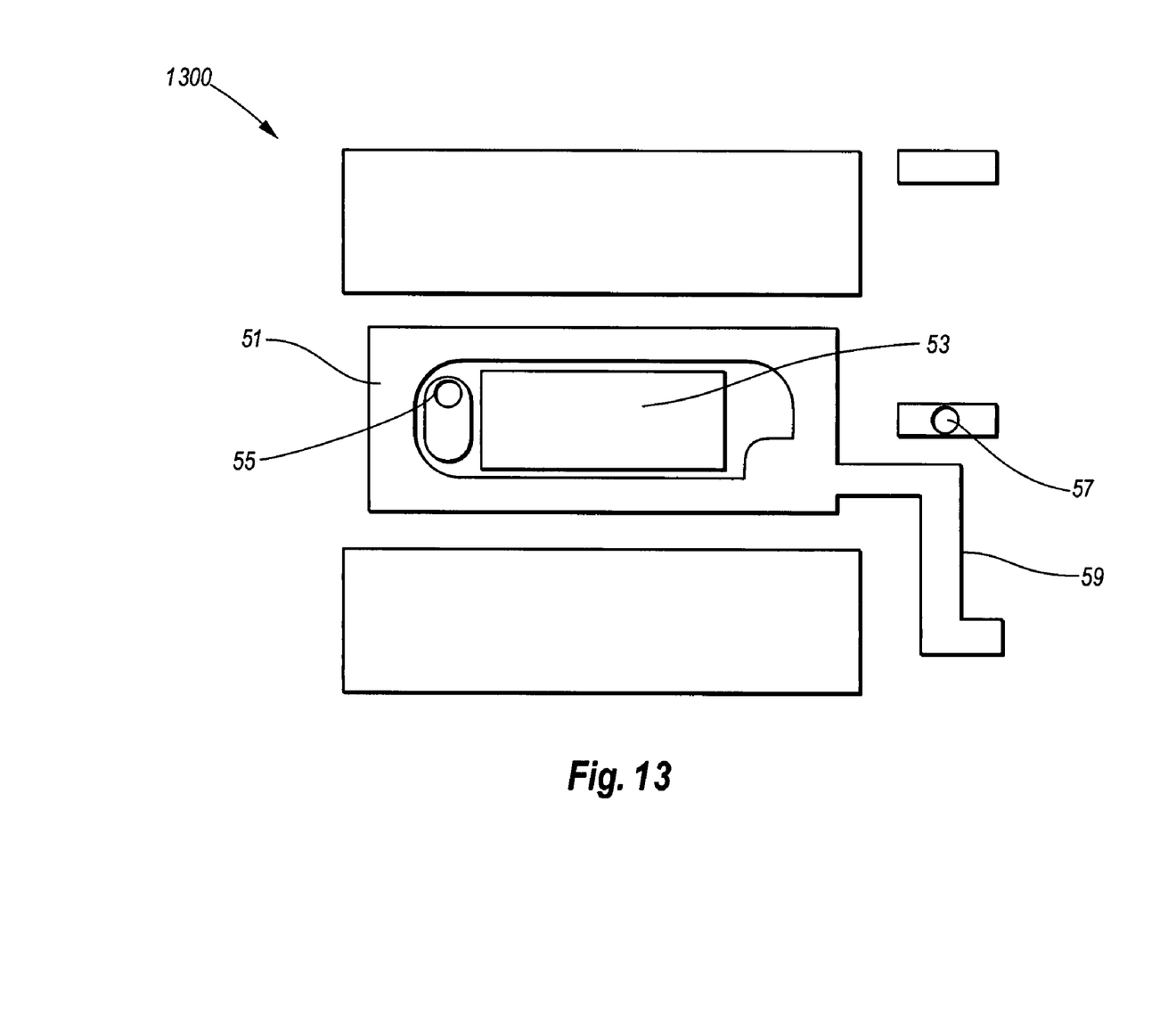
FIG. 13 is a substrate layout diagram illustrating an optical package in combination with two holes or vias and an electrical out from the package in accordance to one embodiment of the present invention.

Referring now to FIG. 13. FIG. 13 is a substrate layout diagram denoted 1300, comprising: a metal contact area composed of metals such as gold denoted 51 that would be covered by a window cap in a completed optical package in accordance to one embodiment of the present invention; a metal contact area denoted 53 that would be occupied by a sub-mount and an optical device or component such as a LOA chip in a completed optical package in accordance to one embodiment of the present invention; a first hole or via denoted 55; a second hole or via denoted 57, and an electrical out denoted 59 that connects the contents inside the window cap to the remainder of an optical package in accordance to one embodiment of the present invention.

The first hole or via 55 makes a first contact to a sub-mount such as sub-mount 27 and a second contact to electrical out 59 via one or more bond wires (not shown). Electrical out 59 and the second hole or via 57 are in turn in contact with the package outside the window cap area via one or more bond wires (not shown). Furthermore, the holes or vias may be either input or output, and the dimensions of the components shown in FIG. 13 are fitted to comply with geometric requirements of an optical package in accordance to one embodiment of the present invention.

Although the invention has been described in connection with several embodiments, it is understood that this invention is not limited to the embodiments disclosed, but is capable of various modifications that would be apparent to a person skilled in the art.

For example, though only one lens is shown on either side of window cap 33, in a second embodiment two such lenses may be lined up to each other and attached to either side of window cap 33.

In the second embodiment, each of the fibers 39 and 41 respectively is attached to one of the two lens on either side of window cap 33. The second embodiment produces parallel beams and improves beam alignment by having two lenses instead of one.

Furthermore, in a third embodiment, an optical element such as an attenuator may be placed between the two lens on either side of the window cap 33 in order to further manipulate the characteristics of beams.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the arts to best utilize the invention and various embodiments with various modifications as are suited to the particular use contemplated. It is intended that the scope of the invention be defined by the claims appended hereto and their equivalents.

We claim:

1. An optical package, comprising:
   an electrically isolated substrate having one or more holes extending from a top surface of the substrate to a bottom surface of the substrate; and
   a window cap encapsulating an optical device on the substrate, wherein at least two holes extend through the window cap.

2. The optical package of claim 1, wherein the substrate comprises at least one layer of ceramic material.

3. The optical package of claim 1, wherein at least one of the one or more holes in the substrate is configured to be a via.

4. The optical package of claim 1, wherein a first hole of the at least two holes is disposed on a first side wall of the window cap.

5. The optical package of claim 4, wherein a second hole of the at least two holes is disposed on a second side wall of the window cap.

6. The optical package of claim 1, further comprising an electrical out on the substrate extending from the window cap.

7. The optical package of claim 6, wherein the optical device is mounted on a sub-mount, the sub-mount being mounted on the substrate.

8. The optical package of claim 7, wherein a first hole of the one or more holes in the substrate contacts the sub-mount via one or more bond wires.

9. The optical package of claim 8, wherein the first hole of the one or more holes contacts the electrical out via one or more bond wires.

10. The optical package of claim 9, wherein the substrate is attached to a frame.

11. The optical package of claim 10, wherein the frame is a lead frame.

12. The optical package of claim 11, wherein one or more isolation elements are mounted on one or more walls of the frame.

13. The optical package of claim 12, wherein the isolation elements are ceramic.

14. The optical package of claim 1, further comprising a Peltier element attached to the bottom surface of the substrate.

15. An optical package comprising:
    an electrically isolated substrate having one or more holes extending from a top surface of the substrate to a bottom surface of the substrate;
    an optical device mounted on a sub-mount that is mounted on the substrate;
    a window cap encapsulating the optical device on the sub-mount, wherein at least one hole extends through the window cap;
    an electrical out on the substrate extending from the window cap, wherein a first hole of the one or more holes in the substrate contacts the electrical out by one or more bond wires; and
    an electrically isolated enclosure enclosing the window cap and substrate, the enclosure having a first end face and a second end face.

16. The optical package of claim 15, wherein a first fiber extends through the first end face, the first fiber being optically coupled with a first lens on the window cap, and a second fiber extends through the second end face, the second fiber being optically coupled with a second lens on the window cap.

17. The optical package of claim 16, further comprising
    a first plurality of leads extending through a first ceramic terminal on the enclosure, the first plurality of leads being in electronic communication with the substrate; and
    a second plurality of leads extending through a second ceramic terminal on the enclosure, the second plurality of leads being in electronic communication with the substrate.

18. An optical package comprising:
    an electrically isolated substrate having one or more holes extending from a top surface of the substrate to a bottom surface of the substrate;
    a window cap encapsulating an optical device on the substrate; and
    an electrical out on the substrate extending from the window cap, wherein a first hole of the one or more holes contacts the electrical out by one or more bond wires.

19. The optical package of claim 18, wherein the optical device is mounted on a sub-mount that is mounted on the substrate, wherein the first hole of the one or more holes contacts the sub-mount by one or more bond wires.

20. The optical package of claim 19, wherein one or more isolation elements are mounted on one or more walls of the frame.

21. The optical package of claim 19, wherein the substrate is attached to a lead frame.

* * * * *